H. COX.
Friction-Attachments for Securing Pulleys to Shafts, &c.
No. 139,704.
Patented June 10, 1873.
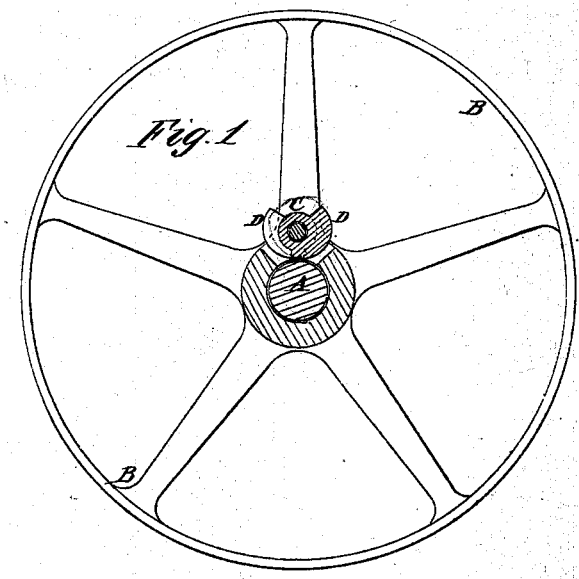
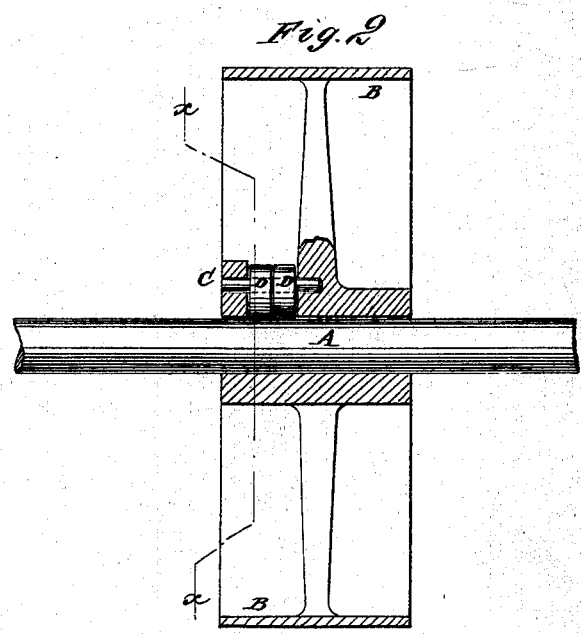
Witnesses:
Inventor:
H. Cox
Per Munn & Co.
Attorneys.

UNITED STATES PATENT OFFICE.

HENRY COX, OF PETERBOROUGH, CANADA.

IMPROVEMENT IN FRICTION ATTACHMENTS FOR SECURING PULLEYS TO SHAFTS, &c.

Specification forming part of Letters Patent No. 139,704, dated June 10, 1873; application filed April 5, 1873.

*To all whom it may concern:*

Be it known that I, HENRY COX, of Peterborough, in the county of Peterborough, Province of Ontario and Dominion of Canada, have invented a new and useful Improvement in Friction Attachments for Securing Pulleys to Shafts, &c., of which the following is a specification:

Figure 1 represents my improved attachment as applied to a pulley and shaft, partly in section through the line $x\ x$, Fig. 2. Fig. 2 is a section of the same taken longitudinally with the shaft.

Similar letters of reference indicate corresponding parts.

The invention consists in the improvement of friction attachments for pulley-shafts, as hereinafter described and pointed out in the claim.

I will describe my invention as applied to a pulley and shaft.

A represents a shaft, upon which is placed a loose pulley, B. In the hub of the pulley is formed a mortise, at the sides of which are formed one or more lugs to receive the pin C, by which the eccentric disk D is pivoted to said hub. By this construction, when the pulley B is turned in one direction it will run freely, but when turned in the other direction the eccentric D will take hold of the shaft A and carry it with the said pulley in its revolution. When more power is required to be applied, two or more of the eccentrics D may be applied, arranged in the same direction, and placed in the same mortise or in different mortises in different parts of the hub, so as to bear against opposite sides of the shaft A. If desired, eccentrics D, two or more, may be used, arranged to operate in different directions, so that the pulley may carry the shaft with it when turned in either direction. The eccentrics D may be provided with springs, if desired, to hold them to their work.

Having thus described my invention, I claim as new and desire to secure by Letters Patent—

The eccentrics D, applied in connection with the pulley B, to secure the pulley on the shaft or prevent its retrograde motion, substantially in the manner described.

HENRY COX.

Witnesses:
CHAS. BURNHAM,
FREDERICK ERNEST BURNHAM.